(12) United States Patent
Sharp et al.

(10) Patent No.: US 10,739,651 B2
(45) Date of Patent: Aug. 11, 2020

(54) SELF-COMPENSATING LIQUID CRYSTAL RETARDATION SWITCH

(71) Applicants: Gary D. Sharp, Boulder, CO (US); Anthony D. McGettigan, Santa Rosa, CA (US)

(72) Inventors: Gary D. Sharp, Boulder, CO (US); Anthony D. McGettigan, Santa Rosa, CA (US)

(73) Assignee: Gary Sharp Innovations, LLC, Boulder, CO (US)

( * ) Notice: Subject to any disclaimer, the term of this patent is extended or adjusted under 35 U.S.C. 154(b) by 0 days.

(21) Appl. No.: 16/195,618

(22) Filed: Nov. 19, 2018

(65) Prior Publication Data

US 2019/0353948 A1 Nov. 21, 2019

Related U.S. Application Data

(60) Provisional application No. 62/588,095, filed on Nov. 17, 2017.

(51) Int. Cl.
| | | |
|---|---|---|
| *G02F 1/1347* | (2006.01) | |
| *G02F 1/13363* | (2006.01) | |
| *G02F 1/139* | (2006.01) | |

(52) U.S. Cl.
CPC ........ *G02F 1/13471* (2013.01); *G02F 1/1395* (2013.01); *G02F 1/13363* (2013.01); *G02F 1/133634* (2013.01); *G02F 2001/133638* (2013.01); *G02F 2413/11* (2013.01)

(58) Field of Classification Search
CPC .......... G02F 1/13471; G02F 1/133634; G02F 1/1395; G02F 1/13363; G02F 2001/133638; G02F 2413/11
See application file for complete search history.

(56) References Cited

U.S. PATENT DOCUMENTS

2012/0044431 A1  2/2012  Osterman et al.
2018/0088381 A1*  3/2018  Lin .................... G02F 1/13471

FOREIGN PATENT DOCUMENTS

| EP | 1589366 B1 | 10/2012 |
|---|---|---|
| JP | 2009-524106 A | 6/2009 |
| KR | 10-0752501 B1 | 8/2007 |
| KR | 10-2013-0033452 A | 4/2013 |

OTHER PUBLICATIONS

International Search Report from PCT Application No. PCT/US2018/061861, dated Mar. 7, 2019.

* cited by examiner

*Primary Examiner* — Phu Vu
(74) *Attorney, Agent, or Firm* — Robert G. Crouch

(57) ABSTRACT

Used herein are two or more switchable variable birefringence liquid crystal devices, in combination with a passive retarder, to produce a device that switches between two retardation values. The device preserves the normal-incidence retardation in each of two voltage states over a broad range of incidence angles using a novel self-compensation scheme. According to one embodiment of this design, the retardation in the thickness direction remains zero in both the unenergized and fully energized states.

23 Claims, 8 Drawing Sheets

A beamsteerer comprising a self compensating switch and a polarization selective reflector

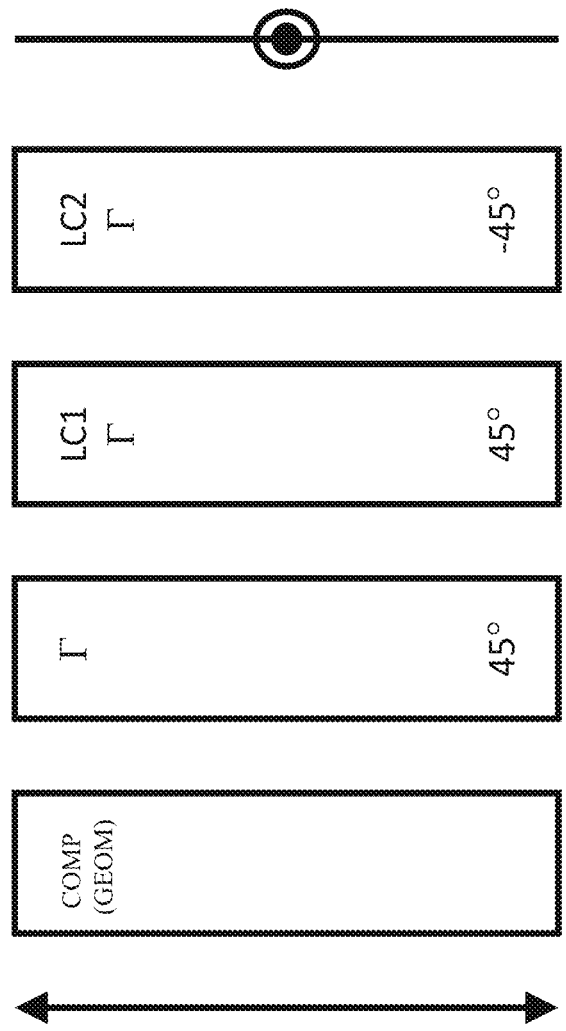
Figure 6: A light shutter comprising a self compensating switch and an analyzer

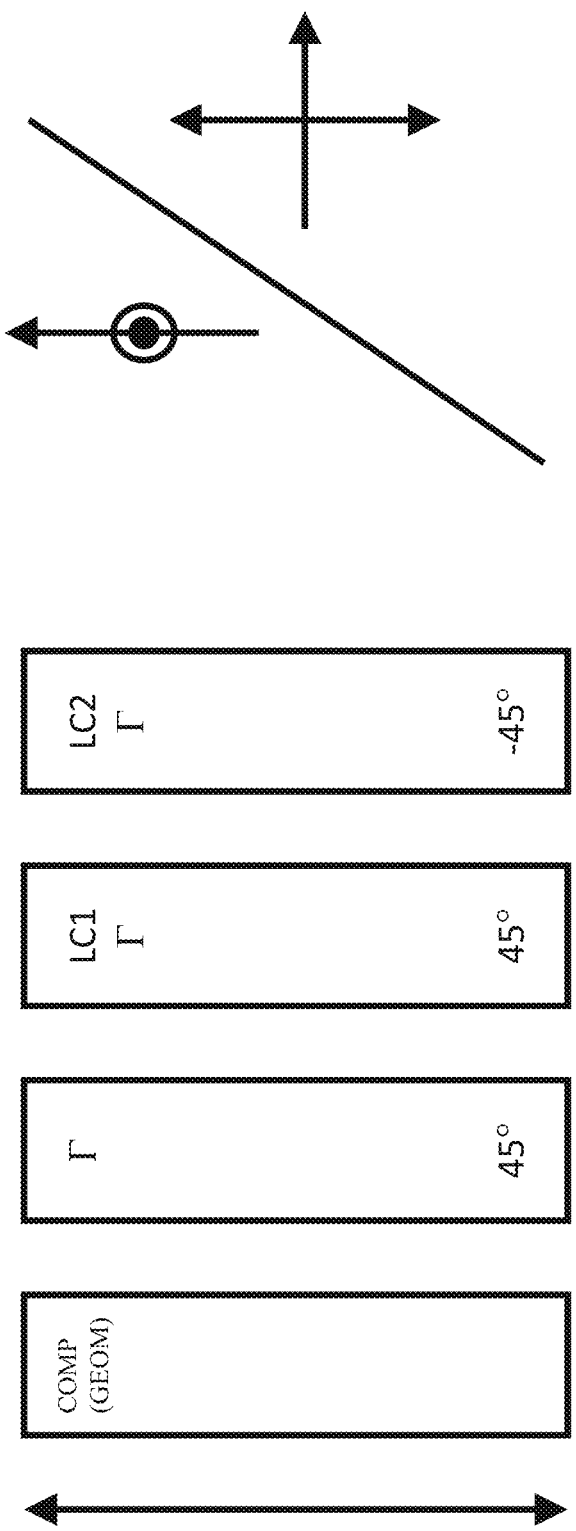
Figure 7: A beamsteerer comprising a self compensating switch and a polarization selective reflector

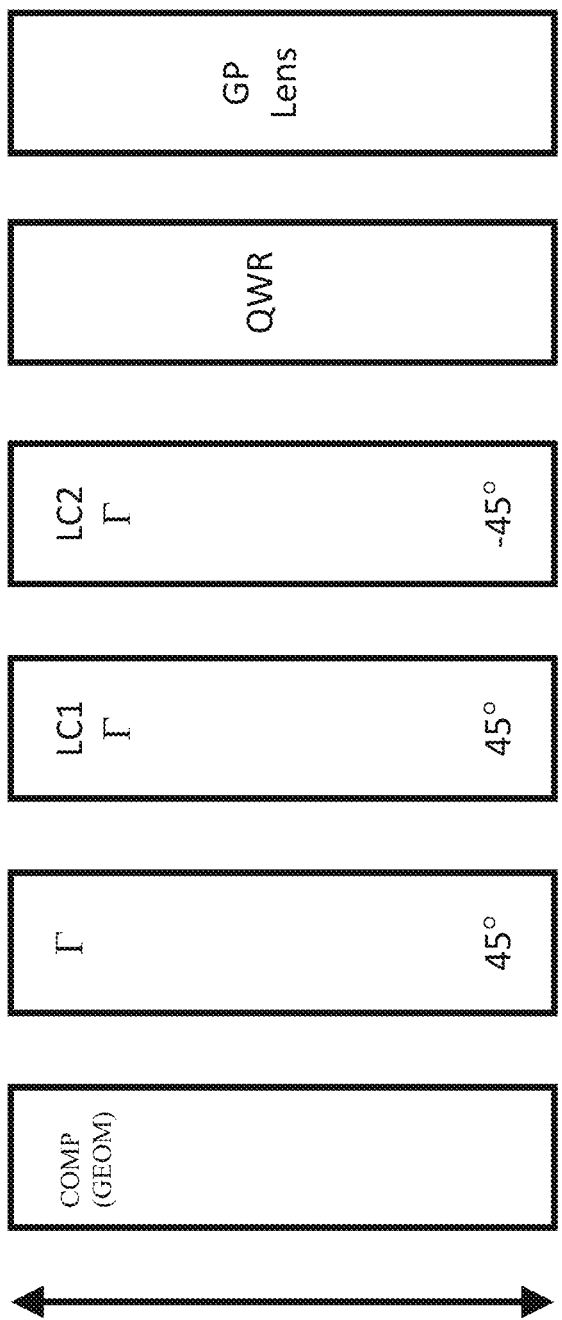
Figure 8: A variable focal length lens comprising a self compensating switch and a geometric phase lens

SELF-COMPENSATING LIQUID CRYSTAL RETARDATION SWITCH

CROSS-REFERENCE TO RELATED APPLICATIONS

This application claims priority to U.S. Provisional Application No. 62/588,095, filed Nov. 17, 2017, the contents of which are incorporated herein by reference in its entirety.

BACKGROUND

A simple retardation-switch of the prior art includes a single variable birefringence liquid-crystal (LC) device. This can be implemented using an electrically controlled birefringence (ECB) device, which is an anti-parallel aligned nematic LC. Or it could be a vertically aligned nematic (VAN) LC, or a pi-cell, which is a parallel-aligned nematic LC. It could even be a mixed-mode nematic such as a 64° twist nematic which for a particular design is known to produce a circular polarization.

Nematic LC devices switch retardation by changing the integrated projection of the optic-axis onto the plane of the substrate. For a typical ECB, the device behaves substantially as a positive uniaxial (+A-plate) retarder at zero volts, and has virtually zero in-plane retardation at a sufficiently high voltage. In many applications, the normal-incidence retardation is preferably preserved over a range of incident cone angles. Devices such as the ECB or VAN device are relatively attractive because they can be operated with very little excess retardation (i.e. retardation that is unmodulated, or passive). And with sufficiently high switching voltage, these devices can suffer very little angle dependence associated with the splay at the substrate boundary. Conversely, the pi-cell can have high passive retardation (e.g. $2/3$ to $5/6$ of the total cell retardation), and can show a high degree of splay in the low-voltage state. As such, the pi-cell can have relatively poor retardation uniformity off-normal in both high and low voltage states.

It is against this background that the present invention has been developed.

SUMMARY

Disclosed herein is a retardation-switching device that includes: a passive bias retarder with an in-plane retardation and a thickness-direction retardation; a first liquid crystal cell (LC1) with a first total-retardation and a voltage-controlled in-plane retardation coupled with a thickness-direction retardation; a second liquid crystal cell (LC2) with a second total-retardation and a voltage-controlled in-plane retardation coupled with a thickness-direction retardation; a first voltage-state, wherein LC1 is driven to a lower-voltage and LC2 is driven to a higher-voltage, wherein LC1 and LC2 each have a first in-plane retardation and a first thickness-direction retardation; and a second voltage-state, wherein LC1 is driven to a higher-voltage and LC2 is driven to a lower-voltage, wherein LC1 and LC2 each have a second in-plane retardation and a second thickness-direction retardation. The bias retarder, LC1, and LC2 are arranged in series such that switching between first and second voltage-states results in a change in the composite in-plane retardation. The magnitude of the composite thickness-direction retardation in both voltage states is less than the maximum composite in-plane retardation.

The first and second LC switches may behave as uniaxial A-plate retarders in their one state and behave as C-plate retarders in their other state. The first liquid crystal cell optic axis may be substantially crossed with the second liquid crystal cell optic axis. A pretilt of each of the switches may be less than 3 degrees. Each of the switches may have a splay and the $R_e$ resulting from the splay in either of the one state or the other state of each of the switches may be less than 10 nanometers. The total retardance of the first and second LC switches may be substantially the same.

The bias retarder may be an A-plate retarder. The optic axis of the liquid crystal cells may be substantially parallel OR perpendicular to the optic axis of the bias retarder. The in-plane retardance of the bias retarder, the first LC switch and the second LC switch may be substantially the same. The in-plane retardance of each of the first and second LC switches may be up to 20% greater than the in-plane retardance of the bias retarder. The A-plate retarder may be a uniaxial quarter-wave retarder with $R_e$ of $\lambda/4$ and $R_{th}$ of $\lambda/8$, where $\lambda$ is the wavelength of light passing therethrough. The retardation of the A-plate bias retarder and the retardation of the first and second LC switches may be matched such that when one of the first and second LC switches is in one of the one state or the other state and the other of the first and second LC switches is in the other of the one state or the other state, a composite $R_{th}$ of the device may be zero; wherein when one of the first and second LC switches is in the one state and the other of the first and second LC switches is in the other state, a composite $R_e$ of the device may be zero; and wherein when the one of the first and second LC switches is in the other state and the other of the first and second LC switches is in the one state, a composite $R_e$ of the device may be $\lambda/2$.

The bias retarder may be a C-plate retarder. The C-plate bias retarder may have an $R_{th}$ of $\lambda/8$, where $\lambda$ is the wavelength of light passing therethrough. The retardation of the C-plate bias retarder and the retardation of the first and second LC switches may be matched such that when one of the first and second LC switches is in one of the one state or the other state and the other of the first and second LC switches is in the other of the one state or the other state, a composite $R_{th}$ of the device may be zero; wherein when one of the first and second LC switches is in the one state and the other of the first and second LC switches is in the other state, a composite $R_e$ of the device is $\lambda/4$; and wherein when the one of the first and second LC switches is in the other state and the other of the first and second LC switches is in the one state, a composite $R_e$ of the device may be $-\lambda/4$.

The device may further include an input polarizer. The device may further include a geometric compensator placed after the input polarizer, the compensator minimizing geometric leakage due to the polarizer and analyzer being crossed. The device may further include an output analyzer, wherein the analyzer is crossed with respect to the polarizer. The device may further include a polarization selective reflective surface at the output. The device may further include a quarter-wave retarder placed at the output. The device may further include a geometric phase diffractive optical element placed at the output.

Also disclosed is a device that includes: a polarizer; an A-plate retarder having in-plane retardation ($R_e$) and thickness direction retardation ($R_{th}$); a first liquid-crystal (LC) switch having an optic axis arranged such that an $R_e$ of the first LC switch sums with the $R_e$ of the A-plate retarder, and being switchable between one state and an other state; and a second LC switch having an optic axis arranged such that an $R_e$ of the second LC switch differences with the $R_e$ of the A-plate retarder, and being switchable between one state and an other state; wherein the first and second LC switches are controlled so one of the switches is in the one state whenever the other of the switches is in the other state; wherein a composite $R_{th}$ of the entire device is substantially lower than the $R_{th}$ of either of the switches individually in either of the one state or the other state; wherein the first and second LC switches behave as uniaxial A-plate retarders in their one state and behave as C-plate retarders in their other state; wherein a pretilt of each of the switches is less than 3 degrees; wherein each of the switches has a splay and the $R_e$ resulting from either of the one state or the other state of each of the switches is less than 10 nanometers; wherein the retardation of the A-plate retarder and the retardation of the first and second LC switches is matched such that when one of the first and second LC switches is in one of the one state or the other state and the other of the first and second LC switches is in the other of the one state or the other state, a composite $R_{th}$ of the device is zero; wherein when one of the first and second LC switches is in the one state and the other of the first and second LC switches is in the other state, a composite $R_e$ of the device is zero; and wherein when the one of the first and second LC switches is in the other state and the other of the first and second LC switches is in the one state, a composite R of the device is $\lambda/2$.

A device, comprising: a polarizer; an A-plate retarder having an optic axis and having in-plane retardation ($R_e$) and thickness direction retardation ($R_{th}$); a first liquid-crystal (LC) switch having an optic axis and having in-plane retardation ($R_e$) and thickness direction retardation ($R_{th}$) and being switchable between one state and an other state; and a second LC switch having an optic axis and having in-plane retardation ($R_e$) and thickness direction retardation ($R_{th}$) and being switchable between one state and an other state; wherein the A-plate retarder and the first and second LC switches are arranged with respect to their respective optic axes such that an $R_e$ of the first LC switch sums with the $R_e$ of the A-plate retarder and such that the $R_e$ of the second LC switch differences with the $R_e$ of the A-plate retarder; wherein the first and second LC switches are operated in anti-phase relative to each other; wherein a composite $R_{th}$ of the entire device is substantially lower than the $R_{th}$ of either of the switches individually in either of the one state or the other state.

BRIEF DESCRIPTION OF THE DRAWINGS

FIG. 6 shows a light shutter including a self-compensating switch and an analyzer.

FIG. 7 shows a beam-steerer including a self-compensating switch and a polarization selective reflector.

FIG. 8 shows a variable focal length lens including a self-compensating switch and a geometric phase lens.

DETAILED DESCRIPTION

Figure 1:
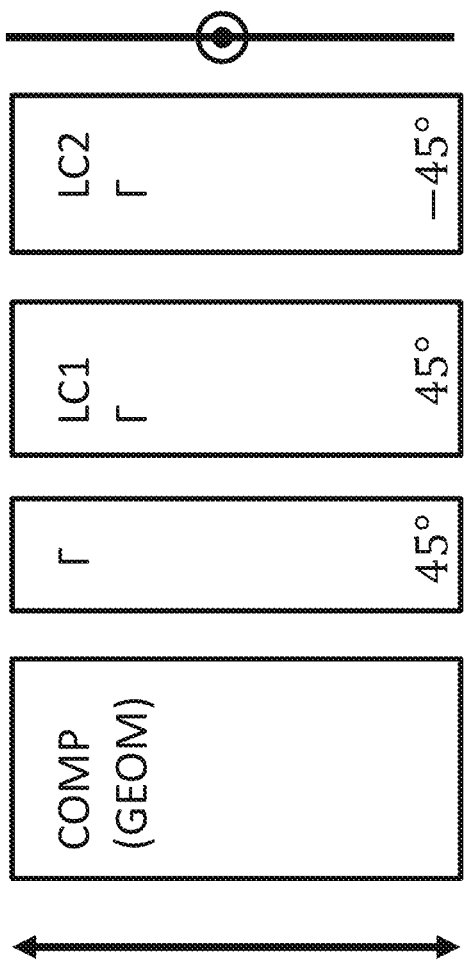
FIG. 1 is a cross-section of a self-compensating retardation switch of the present disclosure.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

The disclosure identifies unique liquid-crystal polarization switches that preserve normal-incidence behavior over the maximum range of incidence angles. The normal incidence behavior may include electro-optical states representing (e.g.) two or more desired in-plane retardation values ($R_e$). For instance, two states may include an $R_e$ with zero-retardation and a half-wave of retardation. An exemplary polarization switch may have (A) minimal excess (i.e. passive) retardation, (B) minimal splay, and (C) minimal thickness-direction retardation ($R_{th}$) in two or more electro-optical states. In one embodiment, passive retardation, splay, and thickness-direction retardation are virtually zero. Since nematic LC devices normally exhibit coupled $R_e$ and $R_{th}$ switching, the techniques taught herein use active compensation, or self-compensation, to decouple these and minimize $R_{th}$ in two or more states.

The disclosure may use a sum-difference scheme to modulate retardation for the purpose of minimizing thickness-direction retardation ($R_{th}$) in two or more electro-optical states. A prior art example of this type of switching is the "Z-Screen" (developed by Stereographics), used in combination with one of the circular polarization eyewear lenses. The purpose of the "push-pull" modulator is specifically to produce fast symmetric 3D switching with passive circular polarizer eyewear; not for the purpose of achieving wide acceptance angle. In fact, the Z-Screen actually has poor field-of-view due to several design limitations. A recent patent by Sharp et al. uses one or more −C-plate retarders to mitigate this problem that is specific to compensating the excess, or passive, retardation of the pi-cell (see U.S. Pat. No. 9,167,236, the entire contents of which are incorporated by reference herein). Passive retardation can be calculated as the difference between the total retardation of the LC cell (birefringence multiplied by cell gap), and the maximum retardation that is modulated between extreme electro-optical states. For instance, a pi-cell requiring 700 nm of total retardation may be required to swing between zero $R_e$ and 130 nm of $R_e$, giving a passive retardation of 570 nm. And because of the large cell retardation in combination with splay, the compensation fails to achieve very large FOV. Conversely, the present disclosure uses cells with minimal passive retardation, along with sufficient voltage to swing a large percentage of cell retardation, and in some cases virtually the entire cell retardation. In one embodiment, matched LC cells with crossed optic axes are used in combination with a matched A-plate retarder to maintain composite retardation in both states over an extraordinarily large range of incidence angles. The passive A-plate, a uniaxial retarder with optic-axis entirely in-plane, can have the dual purpose of enabling the sum-difference retardation scheme, while providing the optimum thickness-direction retardation compensation ($R_{th}$).

Nematic LC devices do not typically represent true variable birefringence switches. Rather, they operate by modulating the integrated projection of the molecular director (optic axis) onto the plane of the substrate when driven electrically. Assuming a low pretilt, the device behaves virtually as an +A-Plate in the zero-volt state (uniaxial retarder with optic axis in the plane of the substrate). When fully energized, the thickness-direction (z-extent) of the splay can be very small (the $R_e$ resulting from the splay in either of the one state or the other state of each of the switches may be less than 10 nanometers), and the device can behave substantially as a +C-Plate retarder (uniaxial with optic axis normal to the substrate). An ECB device driven this way can be characterized by the in-plane retardation, $R_e$, and the thickness direction retardation $R_{th}$, defined as $$R_e = (n_x - n_y)d \quad (1)$$

and, $$R_{th} = \left[\frac{(n_x + n_y)}{2} - n_z\right]d \quad (2)$$

Where d is the liquid crystal cell thickness, $n_x$ and $n_y$ are the in-plane refractive indexes and $n_z$ is that in the thickness direction. $R_{th}$ can be recognized as a retardation resulting from the difference between the average in-plane index and the thickness-direction index. It can contribute to the performance degradation when the incident field has a non-zero projection along z. In fact, retarder films that are stretched both in-plane and in the thickness direction (e.g. Nitto Denko NRZ product) can produce the condition $R_{th}$=0, which gives a retardation that is substantially independent of angle of incidence (AOI).

Assuming a positive uniaxial LC retarder, the above gives $R_e = (n_e - n_o)d$; and $R_{th} = +R_e/2$ at zero volts, where $n_e$ is the extraordinary index (along the rubbing direction, or optic axis) and $n_o$ is the ordinary index in an orthogonal direction. We also have $R_e = 0$; and $R_{th} = -R_e$ in the fully energized state.

Note that in both of the above states the $R_{th}$ value is non-zero, and hence the performance off-normal can be compromised. Moreover, the fundamental behavior of the ECB is to generate a modulated $R_{th}$ because it is intimately coupled with the modulation of $R_e$. This precludes effective passive compensation to improve the performance of both states.

The simple modulator can be compensated by adding (e.g.) a C-Plate that biases the $R_{th}$ value, or adding an A-Plate which biases both the $R_e$ and the $R_{th}$ value. This can be beneficial when the performance of one state is of higher priority than the other, such as the dark-state FOV of an LC display. However, while such a compensator may produce a zero composite $R_{th}$ value for one voltage state, it does so at the expense of the composite $R_{th}$ value of the other state. For instance, a negative C-Plate matched with the positive C-plate retardance of the energized cell produces zero in-plane retardation over a large range of incidence angles. But the consequence is that the zero-volt thickness-direction retardation becomes $R_{th} = +3R_e/2$. And hence, the performance in the unenergized state is further degraded with incidence angle.

In the broadest sense, the present disclosure applies to switchable retarders. Without loss of generality, this is conveniently demonstrated in a light shuttering application where the two states represent zero-retardation, and zero-order half-wave retardation over a broad range of incidence angles. FIG. 1 shows the cross section of the switch, where Γ is the retardation of all three elements. In this arrangement, one cell is driven high when the other is low, and vice-versa. In this way, one LC device generates a +C-Plate retardation, while the other generates a +A-Plate retardation. At normal incidence, the device is functionally an in-plane QW retarder that can be electrically rotated by 90° about the normal. As such, the LC retardation is either summed or differenced with the passive A-Plate retardation. Since Equations 1 and 2 do not depend upon the optic axis orientation in-plane, there is no modulation of the $R_{th}$ value and it is in general zero.

TABLE 1

Truth table, associated in-plane and thickness-direction retardation values, and composite behavior of the retarder switch.

| Element | State 1 | $R_e$ | $R_{th}$ | State 2 | $R'_e$ | $R'_{th}$ |
|---|---|---|---|---|---|---|
| A-Plate | — | λ/4 | λ/8 | — | λ/4 | λ/8 |
| LC1 | 0 | λ/4 | λ/8 | 1 | 0 | −λ/4 |
| LC2 | 1 | 0 | −λ/4 | 0 | λ/4 | λ/8 |
| Composite | ON | λ/2 | 0 | OFF | 0 | 0 |

As the table shows (where Γ=λ represents a full-wave of retardation), the composite retardation modulates between half-wave and zero in-plane retardation, with zero thickness direction retardation in both states. In general, the matching of the three retardation values combined with substantially 100% modulation of the cell retardation provides switching between retardation values of Γ and zero, with AOI self-compensation of both states.

In the case of an optical shutter, where the polarization switch is typically placed between crossed-polarizers, there is an additional design consideration for optimizing AOI performance. In the simple case of a pair of ideal crossed polarizers, the contrast degrades off-normal. Due entirely to geometrical rotation off-normal, there is maximum leakage in the ±45° azimuth that must be separately compensated. The contrast ratio at the worst-case azimuth at an AOI of 45° is only 88:1. The insertion of (e.g.) a biaxial half-wave retarder with $R_{th}$=0 along a polarizer absorbing axis substantially corrects this. This component specifically corrects the polarizer geometrical rotation problem in these azimuth angles off-normal. A zero-order HW compensator can raise the contrast from 88:1 to 375:1 at an extreme incidence angle of 45° in air. Alternatively, an A-Plate/C-Plate combination, or biaxial retarder combined with a negative C-plate can provide a similar function, as are known in the art.

Figure 2:
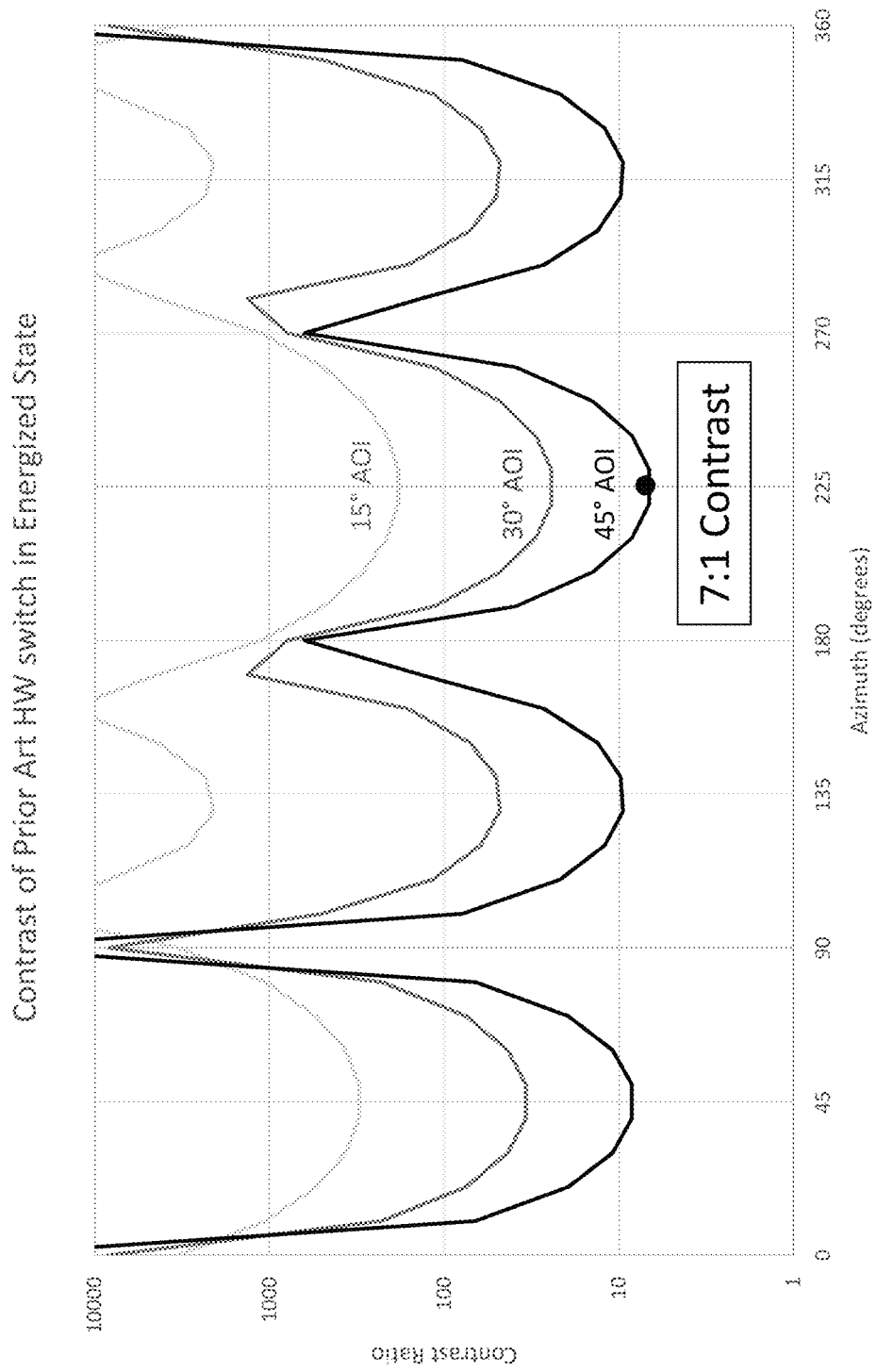
FIG. 2 shows azimuth dependence of contrast-ratio at a few angles of incidence (AOI) for a simple prior art ECB Half-Wave LC retarder in fully energized state between crossed polarizers.
Figure 3:
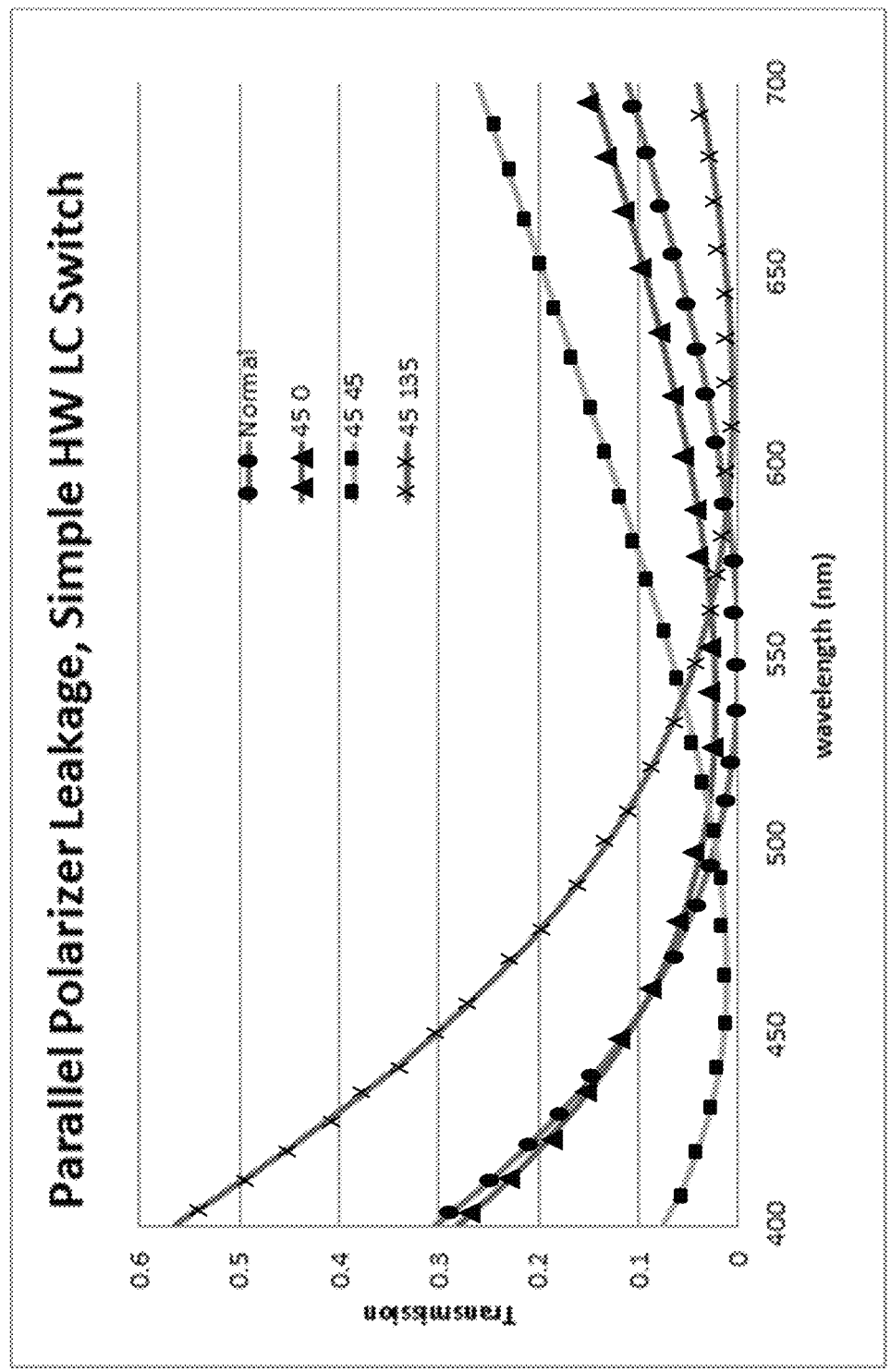
FIG. 3 shows spectral transmission for a simple prior art ECB Half-Wave LC retarder at zero volts for various incidence angles. The optic axis is at 45° to parallel polarizers, which are used to more clearly illustrate the magnitude of leakage and center wavelength of the minimum. The blue-shift in retardation in the 45 azimuth (POI containing OA) is −80 nm and the red-shift in the −45° azimuth is +72 nm. There is also a geometrical leakage in the 0/90° azimuth with relatively small retardation shift.

For benchmark purposes, the insertion of a simple prior art ECB HW retarder at 45° between crossed-polarizers, fully energized to create a black-state at normal incidence, gives a contrast of only 7:1 at the worst-case azimuth and a 45° incidence angle in air. Basically, the large +C-plate retardation of the cell acts to substantially degrade the contrast off-normal in the ±45° azimuth, as illustrated in FIG. 2. Moreover, the presence of non-zero $R_{th}$ in the zero-volt (e.g., HW) state affects the performance off-normal. FIG. 3 shows the transmission spectrum at normal incidence, and at a few azimuth angles off-normal. The non-zero $R_{th}$ produces a HW center wavelength retardation blue-shift of −80 nm when the POI contains the optic axis, and a red-shift of 72 nm when the POI is in an orthogonal axis, at an AOI of 45°. In summary, the prior art retarder switch shows substantial AOI instability in both the unenergized and fully-energized states. Such a HW shift in the context of a shutter or stereoscopic 3D system can represent a color shift with angle. In a 3D projection system, this can be manifested as a spatial shift in the white point on-screen.

Figure 4:
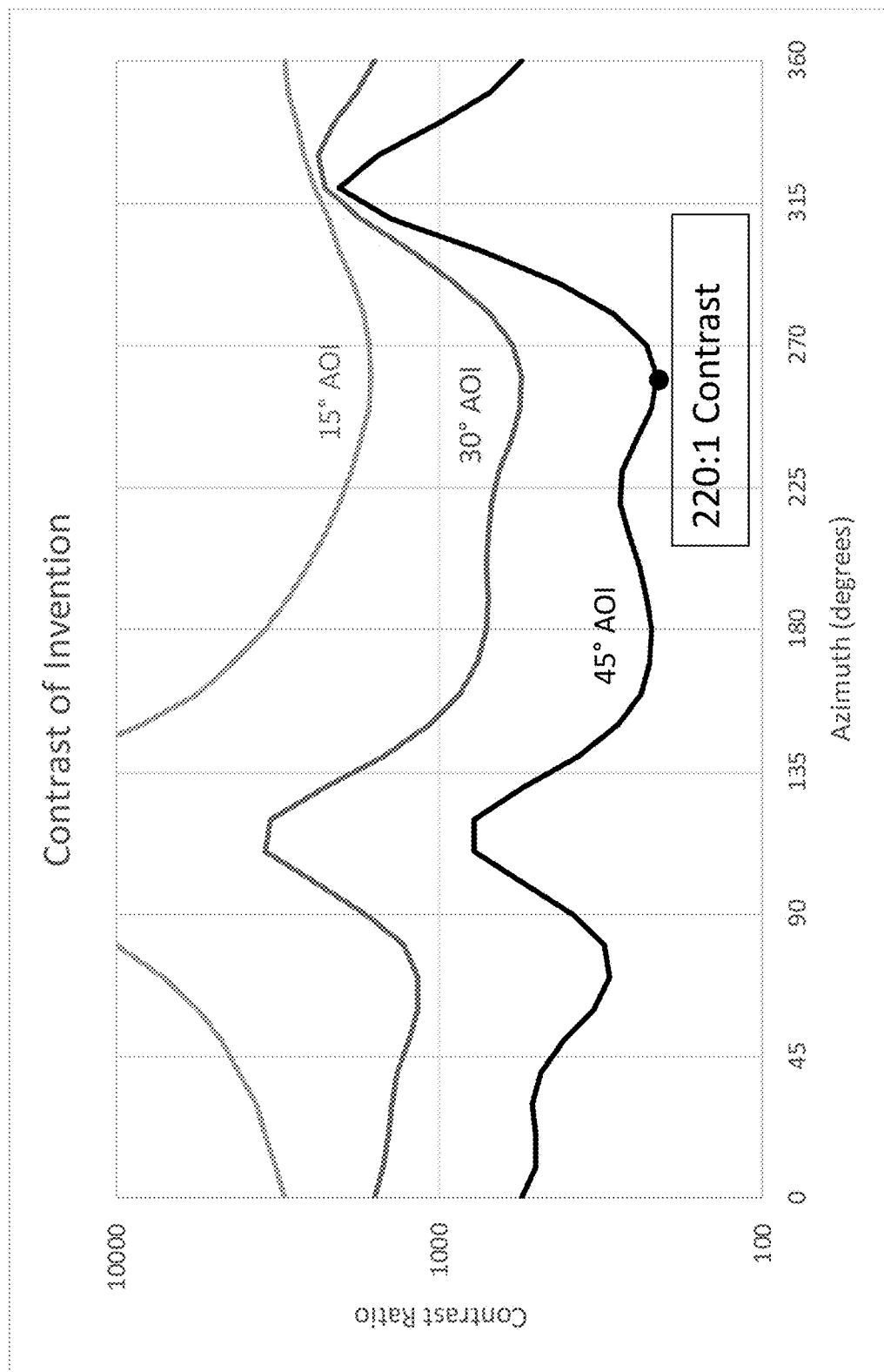
FIG. 4 shows azimuth dependence of contrast-ratio at a few angles of incidence (AOI) for a shutter using the retardation switch of the present disclosure between crossed polarizers. LC1 is fully energized, with LC2 unenergized (difference retardance). The self-compensation of the disclosure, along with a compensator that corrects geometrical rotation of crossed polarizes, increases the worst-case contrast to 220:1 at 45° AOI.

FIG. 1 is a schematic of a self-compensating retardation switch of the present disclosure. In this case, the switch includes an input geometric compensator which is shown to be receptive of polarized light. The geometric compensator is for correcting geometrical rotation and is well known in the art; see "Analytical Solutions for Uniaxial-Film-Compensated Wide-View Liquid Crystal Displays," J. Display Technology 2, 2-20, 2006 and "Transmittance Enhancement for Randomly Aligned Liquid Crystal Displays with Circular Polarizers," Jpn. J. Appl. Phys. 41, L1383-L1385, 2002, the contents of each of which are incorporated herein by reference. Next is a fixed retarder, such as an A-plate retarder. Following this are a pair of liquid crystal switches, each having an optic axis and having in-plane retardation ($R_e$) and thickness direction retardation ($R_{th}$) and being switchable between one state and an other state. The switches may be arranged so that their optic axes are orthogonal to each other. At an output, the light may be polarized as shown. With the configuration of FIG. 1, using a geometrical rotation compensator as discussed previously, the performance is vastly improved. FIG. 4 shows the azimuth dependence of contrast-ratio at a few angles of incidence (AOI) for a shutter using the retardation switch of the present disclosure between crossed polarizers. LC1 is fully energized, with LC2 unenergized (difference retardance). The self-compensation of the disclosure, along with a compensator that corrects geometrical rotation of crossed polarizes, increases the worst-case contrast to 220:1 at 45° AOI. The assumptions used here are that the LC and A-plate are dispersionless (though in practice they may at least be dispersion matched to maintain zero in-plane retardation of one state). The contrast versus azimuth plot shows that the contrast of the zero-retardation state is 220:1 at the worst-case azimuth angle and an AOI of 45°. Essentially, the performance of the inventive switch raises the contrast from 7:1 to 220:1. For example, in the context of a stereoscopic 3D system, this means that the stereo contrast ratio (or ghost cross-talk) may be much better over the entire screen.

Figure 5:
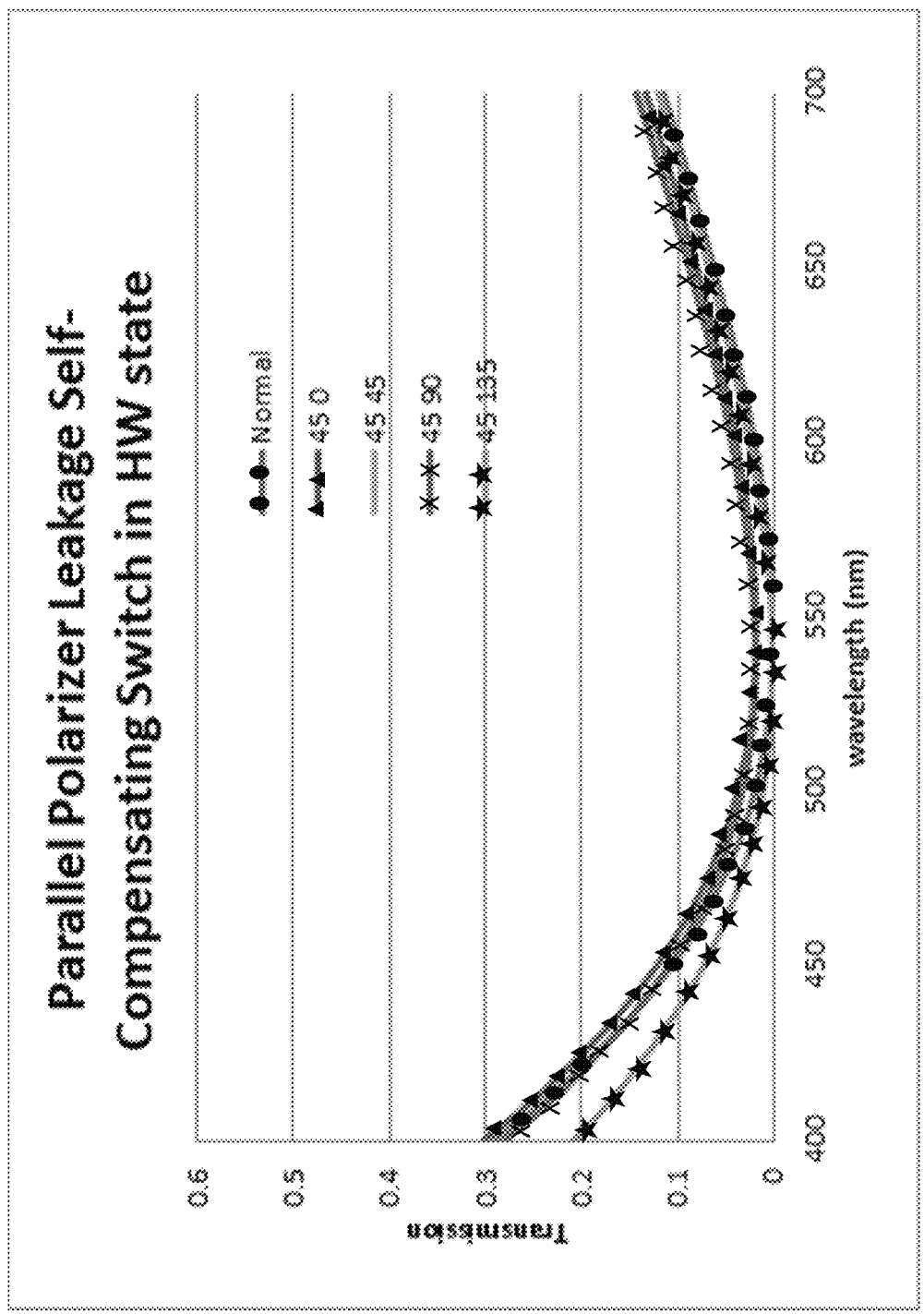
FIG. 5 shows spectral transmission for the retarder switch of the present disclosure for various incidence angles. LC1 is unenergized and LC2 is fully energized (summed retardation). Parallel polarizers are used to more clearly illustrate the leakage and center wavelength of the minimum. The retardation shift is modest relative to that of the simple LC modulator.

Additionally, the retardation shift observed in the prior art switch of FIG. 3 is virtually nullified. FIG. 5 shows that the spectral transmission for the retarder switch of the present disclosure for various incidence angles. LC1 is unenergized and LC2 is fully energized (summed retardation). Parallel polarizers are used to more clearly illustrate the leakage and center wavelength of the transmission minimum. The retardation shift is modest relative to that of the simple LC modulator. In the context of a stereoscopic 3D system, this means that there is almost no color shift of the white-point over the entire screen. Note that some geometrical leakage in the 0/90° azimuth occurs, which may be reduced through additional passive compensation. This is caused by geometrical rotation of the optic axis of the retarder.

Note that the devices disclosed herein are intended to operate so that one of the LC switches is energized and the other is unenergized. This may be referred to as operating in anti-phase. As described above, this can include a summed retardance (LC1 unenergized and LC2 energized) or a difference retardance (LC2 unenergized and LC1 energized).

Wide-acceptance angle retarder switches are enabling for many optical systems and applications. In polarization-based or polarization-sensitive optical systems, it is usually the case that incident light is not completely collimated. Modifications to optical systems to accommodate suitable locations for prior-art angle-sensitive polarization switches (including complex-amplitude modulators, shutters, and state-of-polarization (SOP) generators) can be expensive and in some instances, impossible. By enabling retardation switches that are substantially angle insensitive, devices can be placed at relatively arbitrary locations in an optical system and perform adequately. Examples include projection displays, 3D displays, image-capture devices, polarimeters, switchable diffractive elements, etc. The techniques disclosed herein can be used in (e.g.) any application calling for a shutter as a single-pixel, or in arrays, such as for high-dynamic-range (HDR) display/capture. While the device may have the best performance in the two extreme electro-optical states, some gray-level control can be produced by (e.g.) temporal averaging using a pulse-width-modulation scheme. Alternatively, gray levels can be produced by driving the LC devices in an analog fashion The techniques disclosed herein are particularly advantageous in applications where high performance must be achieved over a broad AOI range in two or more electro-optical states. Quasi-achromatic performance can be achieved in the F retardation-state using zero-order retarders and materials with minimal birefringence dispersion. Should an LC material become available with reverse-dispersion, it could be combined with a reverse-dispersion A-Plate film (e.g. wide-band QW retarder from Teijin) to produce a truly achromatic retarder switch. This can be beneficial for (e.g.) maximizing throughput of shutters, or more generally preserving the magnitude of retardation switching over an extended range of wavelengths. Additionally, a compromise can be struck between the zero-retardation state, which is effectively an isotropic (achromatic) state, and the HW state, by biasing the zero-retardation state with a small passive retarder. For instance, a reverse dispersion film can create a small in-plane retardation in the low retardation state, that benefits the high retardation state, thus balancing the performance. In the high retardation state, the reverse-dispersion film can add preferential retardation at longer-wavelengths to make it more achromatic.

TABLE 3

Generalization of the states of the techniques disclosed herein.

| Element | State 1 | $R_e$ | $R_{th}$ | State 2 | $R_e'$ | $R_{th}'$ |
|---|---|---|---|---|---|---|
| A-Plate | — | $\Gamma_0$ | $\Gamma_0/2$ | — | $\Gamma_0$ | $\Gamma_0/2$ |
| LC1 | 0 | $\Gamma_1$ | $\Gamma_1/2$ | 1 | 0 | $-\Gamma_1$ |
| LC2 | 1 | 0 | $-\Gamma_2$ | 0 | $\Gamma_2$ | $\Gamma_2/2$ |
| Composite | SUM | $\Gamma_0 + \Gamma_1$ | $\frac{(\Gamma_0 + \Gamma_1)}{2} - \Gamma_2$ | DIFF | $\Gamma_0 - \Gamma_2$ | $\frac{(\Gamma_0 + \Gamma_2)}{2} - \Gamma_1$ |

As illustrated in Table 2, the switches of the present disclosure can be used to provide arbitrary sum-difference in-plane switching. However, the only case where the optimum $R_{th}=0$ condition is satisfied in both states is when the retardances of all three elements are matched. In other cases, the AOI benefits (relative to simple modulators) depend upon the specific retardances selected, subject to the composite $R_{th}$ values shown in Table 2. As can be seen, a composite $R_{th}$ of the entire device is substantially lower than the $R_{th}$ of either of the switches individually in either of the one state or the other state.

Switches of the disclosure can be operated in either a binary or analog mode, with the understanding that the latter may suffer FOV performance degradation at voltages associated with intermediate director distributions. That is, director profiles that are not (virtually) either in-plane (A-Plate), or out-of-plane (C-Plate), can have first-order retardation shift with incidence angle. Additionally, the effect of geometric rotations associate with intermediate director profiles can be more pronounced. Conversely, a binary-mode device can have second-order retardation shift with effectively zero composite $R_{th}$.

In one arrangement that optimizes field-of-view, the director profile is made to approximate A-Plate/C-plate switching between the extreme states, as in a binary retardation switch. For an ECB, the A-Plate approximation may entail minimizing the pretilt of the cell (less than 3°, and more preferably approximately 1°) with respect to the substrate. It may also mean achieving the desired retardation at zero-volts, rather than using a small voltage that can increase the out-of-plane director contribution. Conversely, the energized state can be made to approximate a C-Plate by supplying sufficient voltage that the extent of the splay at the boundary is minimized. That is, the director lies virtually normal to the substrate throughout the cell. The A-Plate/C-Plate switching can be considered synonymous with (virtually) zero passive retardation and zero-splay, as described previously. In the event that the switch is built using a VAN mode, the above still applies, with the electro-optical states reversed.

The devices of the present disclosure can be cascaded, with or without intervening polarizers between the stages. To the extent that each stage satisfies the AOI benefits of an optimized design, so too will a multi-stage device. Each stage can switch a specific retardation value, such that the number of retardation values can scale as $2^N$, where N is the number of stages. For instance, one stage can switch between zero and a quarter-wave, with a second switching between zero and a half-wave. This gives a four-state device that steps in linear QW increments. Other configurations, using two or more stages are of course feasible. In some instances, the A-Plate retardation for each stage can be consolidated into a single layer with the composite retardation value. This can simplify the fabrication process and reduce the number of required passive retarders.

In the context of stereoscopic 3D, the techniques disclosed herein can be physically separated into a switching unit that resides at a (projection or direct view) display, and eyewear lenses that reside at the viewer. In this case, the QW A-Plates combined with a linear polarizer make up the eyewear lenses (with ±45° orientations), with the other polarizer and pair of LC devices residing at the display. Unlike the ZScreen of the prior art, such a self-compensating retarder switch enables extremely wide-angle 3D enjoyment. Such a device can be used (e.g.) with modern extremely short-throw projectors.

The retardation switches taught herein can be combined with any polarization-sensitive element to provide various types of switching. FIG. 7 shows a beam-steerer including a self-compensating switch and a polarization selective reflector. FIG. 8 shows a variable focal length lens including a self-compensating switch and a geometric phase lens of the sort described in U.S. Pat. Nos. 7,570,427 and 8,264,623, the contents of each of which are incorporated herein by reference. When proceeded by a (e.g. linear) polarizer, the device can act as a state-of-polarization generator. As shown in FIG. 6, when proceeded/followed by linear polarizers, the device can act as an amplitude/transmission switch, or light shutter. When followed by polarization-sensitive elements, the device can provide various forms of switching. Geometrical-phase optical elements have eigen-polarizations that allow (e.g.) beam-steering (FIG. 7), and focal-length switching (FIG. 8). Polarizing beam-splitters (PBSs) of various types also enable binary beam-steering. Wire-grid or multi-layer (e.g. 3M MOF) films act as PBSs, but they are also thermoformable. This allows them to either pass light, or modify light (e.g. introduce optical power) in reflection, as described in co-pending application (U.S. Pat. App. No. 62/623,493, the entire contents of which are incorporated herein by reference). Adding optical elements within a stage, such as multi-order retarders as described in (U.S. Pat. App. No. 62/623,484, the entire contents of which are incorporated herein by reference), can enable switchable polarization-interference wavelength filters. Retardation switches can also be used in a phase-only mode, such that the absolute phase is modulated, but the state-of-polarization is not. Arrangements that produce hybrids of the above modulation examples are also possible.

The invention can additionally enable wide-angle switching between the handedness of circular polarization states, as may be required (e.g.) for use with elements with circular eigen-polarization. This includes cholesteric liquid crystals and geometrical-phase diffractive elements (e.g., lenses or beam-steerers). In this instance, the A-plate described previously for biasing the $R_e$ value can be replaced by a −C-plate. The latter can have an $R_{th}$ retardation of $-\Gamma/2$, where $\Gamma$ is the retardation of each LC cell. This condition can produce an in-plane $R_e$ switch with minimal composite retardation in each voltage state.

Table 3 presents the truth table for a C-plate biased switch and is analogous to Table 2 (which presented the same for an A-plate biased switch).

TABLE 3

Self compensating LC switch biased with a C-plate retarder

| Element | State 1 | $R_e$ | $R_{th}$ | State 2 | $R_e'$ | $R_{th}'$ |
|---|---|---|---|---|---|---|
| C-Plate | — | 0 | $\Gamma_0/2$ | — | 0 | $\Gamma_0/2$ |
| LC1 | 0 | $\Gamma_1$ | $\Gamma_1/2$ | 1 | 0 | $-\Gamma_1$ |
| LC2 | 1 | 0 | $-\Gamma_2$ | 0 | $\Gamma_2$ | $\Gamma_2/2$ |
| Composite | SUM | $\Gamma_1$ | $\frac{(\Gamma_0+\Gamma_1)}{2} - \Gamma_2$ | DIFF | $-\Gamma_2$ | $\frac{(\Gamma_0+\Gamma_2)}{2} - \Gamma_1$ |

Extending the analogy, Table 4 presents the Truth Table for a Quarter-wave embodiment of a C-plate biased switch. This embodiment is an LHCP/RHCP handedness switch analogous to the A-plate biased s/p linear polarization switch presented in Table 1.

TABLE 4

Quarter-wave self-compensating switch biased with a C-plate retarder

| Element | State 1 | $R_e$ | $R_{th}$ | State 2 | $R'_e$ | $R'_{th}$ |
|---|---|---|---|---|---|---|
| C-Plate | — | 0 | $\lambda/8$ | — | 0 | $\lambda/8$ |
| LC1 | 0 | $\lambda/4$ | $\lambda/8$ | 1 | 0 | $-\lambda/4$ |
| LC2 | 1 | 0 | $-\lambda/4$ | 0 | $\lambda/4$ | $\lambda/8$ |
| Composite | ON | $\lambda/4$ | 0 | OFF | $-\lambda/4$ | 0 |

As noted previously, a bias retarder can be added that can reduce the thickness-direction of one voltage state at the expense of the other. A metric that is insensitive to such bias can indicate the value of the self-compensating switch in suppressing $R_{th}$ in two voltage states. This can be given by $$\Delta R_{th} = |R_{th}| + |R_{th}'|$$

where an optimized design may have $\Delta R_{th}=0$. For the single LC variable retarder described in paragraph 19, where the two extreme voltage states correspond to switching between a +A-plate and +C-plate retarders, the total swing in thickness-direction retardation is substantially $\Delta R_{th}=3R_e/2$. In this example, a metric for the effectiveness of the invention may therefore be given by the degree to which self-compensation reduces $\Delta R_{th}$ below this value. In an exemplary case, as shown in Table 2, matched retarders produce $\Delta R_{th}=0$. However, incremental changes in the retarder relationships can still produce a useful self-compensation. For instance, if the retarders have the relationship $$\Gamma = \begin{cases} \Gamma_0 \\ \Gamma_0 + \delta_1 \\ \Gamma_0 + \delta_2 \end{cases}$$

Where $\delta_1$ and $\delta_2$ are differences between the bias retarder and the LC cells, respectively. If each has an incremental shift of similar value, the above equation can give a value of $$\Delta R_{th} = \frac{(\delta_1 + \delta_2)}{2}.$$

Self-compensation in such an example may therefore be beneficial for any relationship in which the swing in thickness-direction retardation substantially satisfies $$R_e > \frac{(\delta_1 + \delta_2)}{2}$$

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A retardation-switching device, comprising:
   a passive bias retarder with an in-plane retardation and a thickness-direction retardation;
   a first liquid crystal cell (LC1) with a first total-retardation and a voltage-controlled in-plane retardation coupled with a thickness-direction retardation;
   a second liquid crystal cell (LC2) with a second total-retardation and a voltage-controlled in-plane retardation coupled with a thickness-direction retardation;
   a first voltage-state, wherein LC1 is driven to a lower-voltage and LC2 is driven to a higher-voltage, wherein LC1 and LC2 each have a first in-plane retardation and a first thickness-direction retardation;
   a second voltage-state, wherein LC1 is driven to a higher-voltage and LC2 is driven to a lower-voltage, wherein LC1 and LC2 each have a second in-plane retardation and a second thickness-direction retardation;
   wherein the bias retarder, LC1, and LC2 are arranged in series such that switching between first and second voltage-states results in a change in the composite in-plane retardation; and
   wherein the magnitude of the composite thickness-direction retardation in both voltage states is less than the maximum composite in-plane retardation.

2. A device as defined in claim 1, wherein the first and second LC switches behave as uniaxial A-plate retarders in their one state and behave as C-plate retarders in their other state.

3. A device as defined in claim 1, wherein the first liquid crystal cell optic axis is substantially crossed with the second liquid crystal cell optic axis.

4. A device as defined in claim 2, wherein a pretilt of each of the switches is less than 3 degrees.

5. A device as defined in claim 2, wherein each of the switches has a splay and the $R_e$ resulting from the splay in either of the one state or the other state of each of the switches is less than 10 nanometers.

6. A device as claimed in claim 2, wherein the total retardance of the first and second LC switches are substantially the same.

7. A device as claimed in claim 1, wherein the bias retarder is an A-plate retarder.

8. A device as defined in claim 7, where the optic axis of the liquid crystal cells are substantially parallel OR perpendicular to the optic axis of the bias retarder.

9. A device as claimed in claim 7, wherein the in-plane retardance of the bias retarder, the first LC switch and the second LC switch are substantially the same.

10. A device as claimed in claim 7, wherein the in-plane retardance of each of the first and second LC switches is up to 20% greater than the in-plane retardance of the bias retarder.

11. A device as defined in claim 2, wherein the A-plate retarder is a uniaxial quarter-wave retarder with $R_e$ of $\lambda/4$ and $R_{th}$ of $\lambda/8$, where $\lambda$ is the wavelength of light passing therethrough.

12. A device as defined in claim 2, wherein the retardation of the A-plate bias retarder and the retardation of the first and second LC switches is matched such that when one of the first and second LC switches is in one of the one state or the other state and the other of the first and second LC switches is in the other of the one state or the other state, a composite $R_{th}$ of the device is zero;
wherein when one of the first and second LC switches is in the one state and the other of the first and second LC switches is in the other state, a composite $R_e$ of the device is zero; and
wherein when the one of the first and second LC switches is in the other state and the other of the first and second LC switches is in the one state, a composite $R_e$ of the device is $\lambda/2$.

13. A device as defined in claim 1, wherein the bias retarder is a C-plate retarder.

14. A device as defined in claim 13, wherein the C-plate bias retarder has an $R_{th}$ of $\lambda/8$, where $\lambda$ is the wavelength of light passing therethrough.

15. A device as defined in claim 13, wherein the retardation of the C-plate bias retarder and the retardation of the first and second LC switches is matched such that when one of the first and second LC switches is in one of the one state or the other state and the other of the first and second LC switches is in the other of the one state or the other state, a composite $R_{th}$ of the device is zero;
wherein when one of the first and second LC switches is in the one state and the other of the first and second LC switches is in the other state, a composite $R_e$ of the device is $\lambda/4$; and
wherein when the one of the first and second LC switches is in the other state and the other of the first and second LC switches is in the one state, a composite $R_e$ of the device is $-\lambda/4$.

16. A device as defined in claim 1, and further including an input polarizer.

17. A device as defined in claim 1, and further including a geometric compensator placed after the input polarizer, the compensator minimizing geometric leakage due to the polarizer and analyzer being crossed.

18. A device as defined in claim 16, and further including an output analyzer, wherein the analyzer is crossed with respect to the polarizer.

19. A device as defined in claim 16, and further including a polarization selective reflective surface at the output.

20. A device as defined in claim 16, and further including a quarter-wave retarder placed at the output.

21. A device as defined in claim 16, and further including a geometric phase diffractive optical element placed at the output.

22. A device, comprising:
a polarizer;
an A-plate retarder having in-plane retardation ($R_e$) and thickness direction retardation ($R_{th}$);
a first liquid-crystal (LC) switch having an optic axis arranged such that an $R_e$ of the first LC switch sums with the $R_e$ of the A-plate retarder, and being switchable between one state and an other state; and
a second LC switch having an optic axis arranged such that an $R_e$ of the second LC switch differences with the $R_e$ of the A-plate retarder, and being switchable between one state and an other state;
wherein the first and second LC switches are controlled so one of the switches is in the one state whenever the other of the switches is in the other state;
wherein a composite $R_{th}$ of the entire device is substantially lower than the $R_{th}$ of either of the switches individually in either of the one state or the other state;
wherein the first and second LC switches behave as uniaxial A-plate retarders in their one state and behave as C-plate retarders in their other state;
wherein a pretilt of each of the switches is less than 3 degrees;
wherein each of the switches has a splay and the $R_e$ resulting from either of the one state or the other state of each of the switches is less than 10 nanometers;
wherein the retardation of the A-plate retarder and the retardation of the first and second LC switches is matched such that when one of the first and second LC switches is in one of the one state or the other state and the other of the first and second LC switches is in the other of the one state or the other state, a composite $R_{th}$ of the device is zero;
wherein when one of the first and second LC switches is in the one state and the other of the first and second LC switches is in the other state, a composite $R_e$ of the device is zero; and
wherein when the one of the first and second LC switches is in the other state and the other of the first and second LC switches is in the one state, a composite $R_e$ of the device is $\lambda/2$.

23. A device, comprising:
a polarizer;
an A-plate retarder having an optic axis and having in-plane retardation ($R_e$) and thickness direction retardation ($R_{th}$);
a first liquid-crystal (LC) switch having an optic axis and having in-plane retardation ($R_e$) and thickness direction retardation ($R_{th}$) and being switchable between one state and an other state; and
a second LC switch having an optic axis and having in-plane retardation ($R_e$) and thickness direction retardation ($R_{th}$) and being switchable between one state and an other state;

wherein the A-plate retarder and the first and second LC switches are arranged with respect to their respective optic axes such that an $R_e$ of the first LC switch sums with the $R_e$ of the A-plate retarder and such that the $R_e$ of the second LC switch differences with the $R_e$ of the A-plate retarder;

wherein the first and second LC switches are operated in anti-phase relative to each other;

wherein a composite $R_{th}$ of the entire device is substantially lower than the $R_{th}$ of either of the switches individually in either of the one state or the other state.

* * * * *